H. L. ALDIS.
TELESCOPIC SIGHTING DEVICE.
APPLICATION FILED JAN. 6, 1919.
1,317,749.
Patented Oct. 7, 1919.
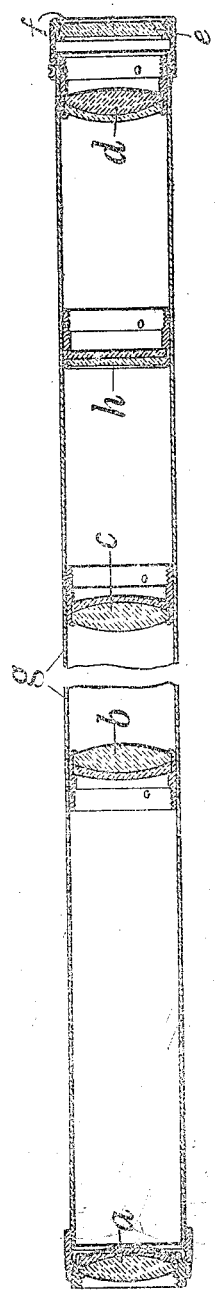
Inventor
H. L. Aldis.
By H. R. Kerslake
Atty.

UNITED STATES PATENT OFFICE.

HUGH LANCELOT ALDIS, OF BIRMINGHAM, ENGLAND.

TELESCOPIC SIGHTING DEVICE.

1,317,749.  Specification of Letters Patent.  Patented Oct. 7, 1919.

Application filed January 6, 1919. Serial No. 269,966.

*To all whom it may concern:*

Be it known that I, HUGH LANCELOT ALDIS, residing at Sare Hole Road, Sparkhill, in the city of Birmingham, England, subject of the King of Great Britain and Ireland, have invented certain new and useful Improvements Relating to Telescopic Sighting Devices, of which the following is a specification.

This invention has for its object to provide an improved telescopic sight adapted for use in the aiming of projectiles.

The invention comprises the use of any coaxial lens system by which can be obtained an erect image with unit magnification and large eye freedom.

Generally the invention comprises the combination of end and intermediate lens systems complying with the above mentioned conditions and arranged axially with considerable intervals between them, cross wires or other indexes being provided at any convenient focal position within the instrument.

The accompanying drawing shows a longitudinal section of a sight constructed in accordance with this invention.

In carrying the invention into effect as shown to a gun or rifle sight (or a sight for use in the dropping of bombs from an aerial machine), four lens systems $a$, $b$, $c$ and $d$ are employed. The two end ones $a$ and $d$ each consists of preferably cemented lenses forming an aplanatic and approximately achromatic combination, and the intermediate systems $b$ and $c$ also consist of like cemented aplanatic and approximately achromatic combinations. The two intermediate combinations are arranged at a distance apart equal to the sum of their focal lengths, in order to obtain the maximum angle of vision. All the combinations have considerable intervals between them. The curvatures and disposition of the lens elements are such that the arrangement is symmetrical or nearly symmetrical about the center point of the systems, and the whole construction such that an erect image without magnification is visible when the observer's eye is placed at a distance from the instrument. Cross wires or other indexes are situated at suitable positions between the lens systems.

The particulars of the lenses employed in the arrangement illustrated are as follows:—

The lens systems are similar and each comprises a meniscus lens of flint glass and a double convex lens of crown glass. The glass used in the first is of the kind technically specified as extra dense flint nD 1.651, dispersion C to F 33.5, and that of the second as hard crown nD 1.518, dispersion C to F 60.7.

The outer radius of the meniscus lens is 1.68 and that of the double convex lens is 1.79; the radius of the contiguous surfaces is .75 inch. The focal length of each compound lens is 2 inches. Adjacent objectives are placed in telescopic adjustment.

With an instrument as above described the observer's eye when placed on the axis at a distance from the eye lens sees perfect continuity between the image of distant objects as formed by the telescope and the adjacent portions of the objects as seen by direct vision.

On the outer side of the lens $d$ is mounted a cover glass $e$ which is arranged with its outer surface as nearly flush as possible with the outer edge of the cell $f$ in which it is carried. Between the lenses $c$ and $d$ is mounted an index or graticule consisting of cross lines or other markings or glass disks $h$ and the whole of the lens system is carried in a tubular body $g$. All external fastenings are thoroughly soldered in position and before sealing the last screw the interior of the instrument is thoroughly exhausted and carefully dried air admitted. The instrument is then quickly sealed. By this procedure internal misting due to external changes of temperature is avoided.

Having thus described my invention what I claim as new and desire to secure by Letters Patent is:—

1. A telescopic sighting device consisting of two fixed intermediate and two fixed end lenses arranged with considerable intervals between them, the lenses being all similar and symmetrically arranged relatively to a transverse center line, and an index at any convenient focal position, the whole forming a coaxial system giving an erect image with unit magnification and large eye freedom, substantially as described.

2. A telescopic sighting device consisting of two intermediate and two end lenses arranged with considerable intervals between them, the lenses being all similar and symmetrically arranged relatively to a transverse center line, an index at any convenient focal position, a cover glass at one end, a cell carrying such glass with its edge as nearly flush as possible with the surface of the glass, and a tubular body carrying the said parts, the body being exhausted and filled with dried air and finally hermetically sealed, substantially as described.

In testimony whereof I have signed my name to this specification.

HUGH LANCELOT ALDIS.